United States Patent
Moghe

(10) Patent No.: US 6,173,323 B1
(45) Date of Patent: Jan. 9, 2001

(54) ADAPTIVE POLLING RATE ALGORITHM FOR SNMP-BASED NETWORK MONITORING

(75) Inventor: Pratyush Moghe, Aberdeen, NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 08/998,213

(22) Filed: Dec. 24, 1997

(51) Int. Cl.$^7$ .......................... G06F 15/16; G06F 15/173
(52) U.S. Cl. .................. 709/224; 709/235; 709/225; 340/825.07; 340/825.55; 379/92.01
(58) Field of Search .................. 709/224, 226, 709/235, 227; 340/825.07, 825.08, 825.55; 372/220; 710/220; 379/92.01

(56) References Cited

U.S. PATENT DOCUMENTS

| | | | |
|---|---|---|---|
| 4,598,363 | * 7/1986 | Clark et al. | 364/200 |
| 4,689,619 | * 8/1987 | O'Brien | 340/825.08 |
| 4,905,233 | * 2/1990 | Cain et al. | 370/237 |
| 5,084,875 | * 1/1992 | Weinberger et al. | 714/46 |
| 5,193,151 | * 3/1993 | Jain et al. | 709/237 |
| 5,276,677 | * 1/1994 | Ramamurthy et al. | 370/232 |
| 5,633,859 | * 5/1997 | Jain et al. | 370/234 |
| 5,659,787 | * 8/1997 | Schieltz | 709/226 |
| 5,896,561 | * 4/1999 | Schrader et al. | 455/67.1 |
| 5,922,051 | * 7/1999 | Sidey | 709/223 |

OTHER PUBLICATIONS

A multiple access scheme for Wireless access to a broadband ATM LAN polling and sectored antennas, Mahmoud, A.S.; Mahmoud, S.A.; Falconer, D.D. Dept. of Syst. & Compt. Eng. Carleton Univ., Ottawa, Ont. Canada, pp. 596–608, May, 1996.*

Adaptive polling schemes for an ATM bus, Karlsson, J.M.; Perros, H.G.; Viniotis, I., Center for Commun. & Signal Process, North Carolina State Univ., Raleigh, NC, USA, pp. 403–407, ISBN: 0–7803–0006–8, May 1996.*

J. Case et al., "A Simple Network Management Protocol (SNMP)", RFC 1157, Network Working Group, IETF, 1990.

R. Sturm, "Q&A", Open View Advisor, pp. 11–13, 1(2), Mar. 1995.

A.B. Bondi, "A nonblocking mechanism for regulating the transmission of network management polls", IM'97, pp. 565–580, May 1997.

Analysis of symmetric nonexhaustive polling with multiple server, Marsanm, de Moraes, Donatelli, Neri, INFOCOM '90 May 6,1990.*

\* cited by examiner

*Primary Examiner*—Mark H. Rinehart
*Assistant Examiner*—Beatriz Prieto

(57) ABSTRACT

A rate adaptive polling method sensitive to network congestion is used to monitor network resources. Initially, a baseline rate constraint is set based on desirable engineering factors. Unacknowledged polls are retransmitted with timeouts, successively increasing by a factor of 2. During each polling round, the rate is adapted in accordance with congestion feedback and changes in node status such as recently activated or deactivated nodes. Congestion feedback is estimated from a congestion metric computed as the average delay of all active nodes. Depending on the value of the congestion metric corresponding to polling round $R_j$, the minimum rate of polling for round $R_{j+1}$ is adapted accordingly.

8 Claims, 1 Drawing Sheet

ADAPTIVE POLLING RATE ALGORITHM FOR SNMP-BASED NETWORK MONITORING

TECHNICAL FIELD

This invention relates generally to the field of network management and in particular to a method for efficient polling of network hosts and resources and a network manager for implementing the same.

BACKGROUND OF THE INVENTION

Referring to FIG. 1, identifying the various hosts and resources 13, 15 and 17–19, connected and available to a network 18 is a vital part of proper network management. Typically one host on the network is assigned the task of network manager ("NM") 10, running appropriate software, while the remaining hosts and resources are identified as agents. The manager 10 will periodically request information from the agents using one of a variety of protocols, e.g. Simple Network Manager Protocol ("SNMP") at the application layer, or Packet Internet Groper ("PING") at the IP layer, and expect a response from each agent using the same protocol. This process is referred to as "polling."

Efficient polling is becoming increasingly important with new bandwidth-intensive applications such as conferencing and web-push applications. Proper monitoring of the network can help deploy such applications. The collected traffic pattern of the network can be used to set and administer policies on application use, to configure intranet switches and routers, and to detect errant behavior. The challenge in polling is to be able to poll with high throughput, yet avoid intruding on the performance of user applications in the network.

Presently, the de facto network management software is marketed by Hewlett Packard under the trade name OpenView ("OV") and described more fully in R. Sturm, "Q&A", OpenView Advisor, pp. 11–13, 1(2) (March 1995), hereby incorporated by reference as if fully set forth herein. In operation, OV can transmit a maximum of N outstanding polls, where N is typically 3. For example, NM 10 may send a first poll to node 17. NM 10 will then wait a time-out period $T_1$, for a response. If no response is received, a second poll is sent to node 17 and NM 10 will wait a time-out period $2\times T_1$, for a response. This is repeated two more times with corresponding time-out periods of $4\times T_1$ and $8\times T_1$, respectively. NM 10 resends the poll these four times with continuously increasing time-out periods in order to rule out that the lack of a response is due to network traffic. If after four attempts no response to the polls is received, NM 10 concludes that node 17 is unavailable to the network.

It has been reported that the foregoing method of polling network resources is inefficient and leads to network "freeze up" as for example when a succession of nodes are unresponsive. See, A. B. Bondi, "A Nonblocking Mechanism for Regulating the transmission of Network Management Polls" IM '97, pp. 565–80 (May 1997), hereby incorporated by reference as if fully set forth herein. One proposed solution to ameliorate the deficiencies of the OV method is described in Bondi, supra. As described more fully therein, a minimum time threshold $\tau$ is set under which no two polls can be transmitted, while the maximum number of polls parameter N of OV is eliminated. As a result, freeze up is avoided by removing the constraint of N and network traffic is managed with constraint $\tau$. However, even this proposal suffers from its inability to provide feedback relating to network congestion. The ability of a poller to quickly adapt to congestion is becoming increasingly important. Newer applications require continual monitoring, for example, at a rate of 5% of network capacity. Such monitoring can cause a network that is already congested with user traffic to collapse.

SUMMARY OF THE INVENTION

Accordingly, the present invention provides an adaptive rate of polling which is sensitive to network congestion. In accordance with the invention the network resources are polled with a minimum rate of transmission to avoid "freeze up," while also providing feedback as to network congestion. Initially, a baseline rate constraint is set based on desirable engineering factors. Unacknowledged polls are retransmitted with timeouts, successively increasing by a factor of 2. During each polling round, the rate is adapted in accordance with congestion feedback based on earlier poll responses and changes in node status such as recently activated or deactivated nodes.

DETAILED DESCRIPTION OF THE INVENTION

In accordance with the present invention a network manager begins an initial polling round at a rate $R_0$ and a corresponding maximum number of hosts to be polled in a polling round, $N_{max}$. These initial parameters are typically based on engineering criteria. Thus for the initial round j=1, $R_j$ is set equal to $R_0$ and $N_j$ is set equal to $N_{max}$. Using SNMP, the network manager sends a poll to each of $N_j$ active nodes, where polls to consecutive nodes are spaced by a time equal to $1/R_j$, and as in OV, waits for an acknowledgment from each polled node for a period of time $T^1$. In one advantageous embodiment of the present invention $T^1$ is set equal to 10 seconds. If an acknowledgment is not received within time $T^1$, another poll is sent and the NM waits for an acknowledgment for a period of time $2\times T^1$. This continues two more times for corresponding waiting periods of $4\times T^1$ and $8\times T^1$, respectively. If after four polls a node does not respond it is taken off the list of active nodes that are used in the next immediate round j+1. A node is returned to the active list through well-known mechanisms like traps, as described more fully in J. Case, et al., "A Simple Network Management Protocol (SNMP)" RFC 1157, Network Working Group, IETF (1990), hereby incorporated by reference as if fully set forth herein.

Figure 1:
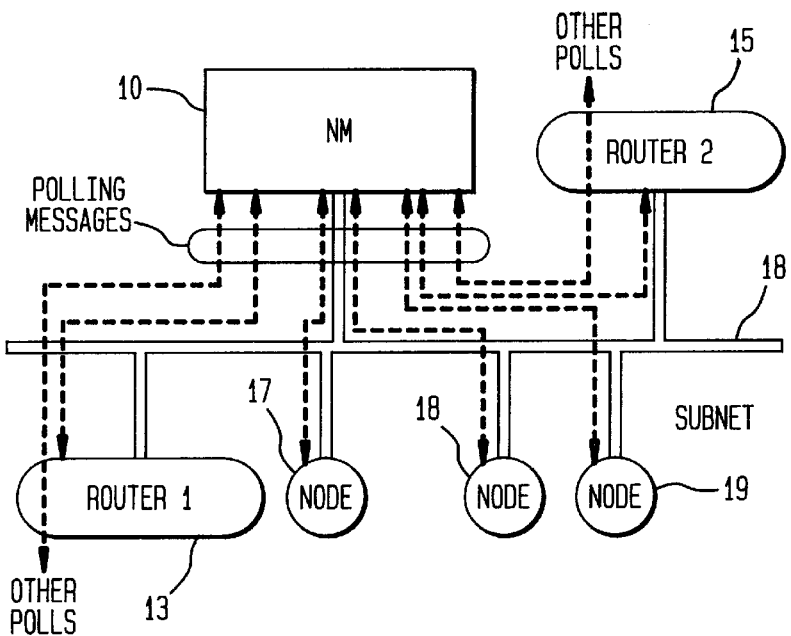
FIG. 1 is prior art diagram of a network of hosts and routers monitored by a network manager through polling.
Figure 2:
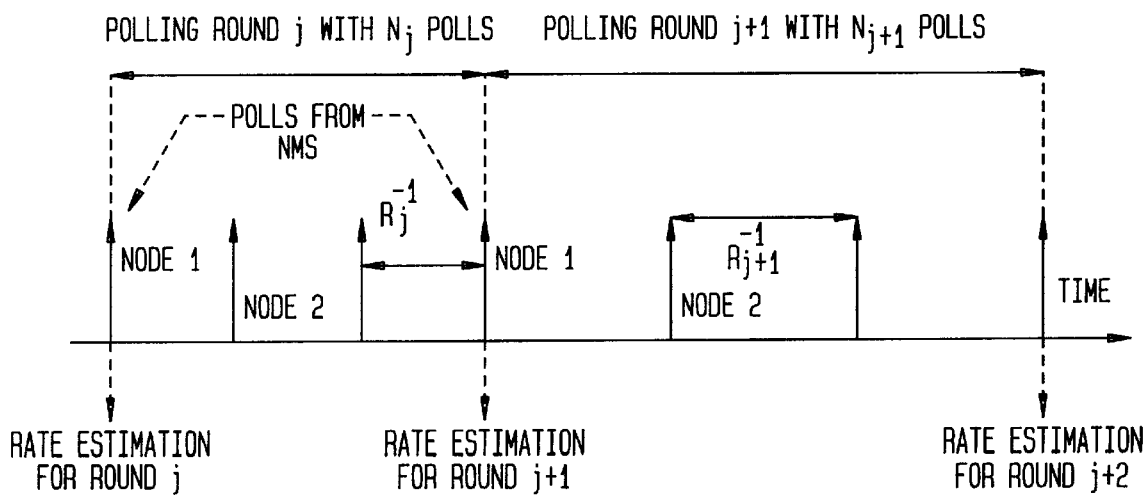
FIG. 2 is a time line describing the polling rate adaptation of the present invention.

Referring to FIG. 2, after the last node in round j is polled, round j+1 begins. Prior to polling further network resources, the network manager notes the number of active nodes after round j, as $N_{j+1}$, the polling rate of the prior round, $R_j$, and the congestion feedback which is derived from the received acknowledgments during round j. These parameters are then used to compute the polling rate $R_{j+1}$ for round j+1, which entails estimating the network congestion from polls issued in round j.

In particular, a congestion metric $\overline{D_j}$ is computed as the average delay over the resolved and outstanding polls. Polls are resolved when the node acknowledges the poll. They are outstanding when they have not been acknowledged but the NM has not concluded that the polled node is inactive. Thus the sum of the delays of acknowledged polls is added to the sum of the current timeout values of all outstanding delays and the result is divided by the number of outstanding and resolved polls. This metric represents the acknowledgment delay of the active polls.

With $\overline{D_j}$, congestion can be estimated by comparison with the levels of timeout described above. Thus for example, if $\overline{D_j}$ is less than or equal to $T^1$, e.g. 10 seconds, the network is normally loaded and not experiencing congestion. For D $\overline{D}_j$ greater than $T^1$ but less than or equal to $T^2$, e.g. 20 seconds, the network is experiencing a first level of congestion. Similarly for the third and fourth levels of timeout, the network would be experiencing second and third levels of congestion, respectively. Each range of consecutive time-out values from a lower bound to a next upper bound, represents a level of congestion. Thus for four time-out values, there exists congestion levels 1 through 3, represented by the variable k.

This congestion feedback $\overline{D}_j$ is used to adapt the polling rate at round j+1. In the presence of any level of congestion 1 through 3, i.e. $T^k < \overline{D}_j \leq T^{k+1}$, the equation $$R_{j+1} = \min\left(\frac{N_{j+1}}{N_{\max}} \times R_0, \frac{R_j}{2^k}\right)$$

is used. The multiplicative factor of $2^{-k}$ corresponds to the exponential growth of delay in the presence of congestion with a slight increase in throughput. Thus the polling rate must be reduced exponentially fast. As congestion increases the minimum of the above two terms is biased toward the right term which causes the polling rate to decrease. Furthermore, as nodes become inactive the desired period for polling a particular node can be maintained even at a slower polling rate since there are fewer nodes to poll within the same period of time. In this case the left term is biased as the new polling rate.

Under a normal load, however, where $\overline{D}_j$ is less than or equal to $T^1$, the delay will grow approximately linearly with increased load. Thus to assure that the network will not become congested, the right most term of the right side of the equation is modified by setting k=0 and adding a $\Delta R$ which is typically a small fraction of $R_0$, for example $R_0/10$. Thus $R_j + \Delta R_0$. In this way, the method of rate adaptive polling in accordance with the present invention maximizes the benefits of polling by maintaining a desired polling rate whenever possible and minimizes the undesirable effects of bandwidth congestion.

The foregoing merely illustrates the principles of the present invention. Those skilled in the art will be able to devise various modifications, which although not explicitly described or shown herein, embody the principles of the invention and are thus within its spirit.

What is claimed is:

1. A method for monitoring network nodes with a minimum polling rate per round j, $R_j$, said method comprising the steps of:

polling said nodes during each round at said rate $R_j$ where $R_j$ equals $R_0$ for said initial round;

estimating congestion in said network experienced during said round j;

adapting the polling rate for round j+1 based on said estimated congestion during round j, said adapted polling rate for round j+1 represented as $R_{j+1}$; and setting j=(j+1) and repeating said polling, estimating and adapting steps.

2. A method according to claim 1 wherein $R_j$ is set initially to $R_0$, and said estimating step further comprising the step of computing a congestion metric $\overline{D}_j$ as the average delay over all resolved and outstanding polls.

3. A method according to claim 2 wherein said network comprises an initial maximum number of nodes to be polled in a round, $N_{max}$, said method further comprising a list of active nodes, said polling steps further comprising the steps of:

transmitting up to four successive polls to each node where said node fails to acknowledge a prior poll within a predetermined period of time $T^1$ and wherein $T^1$ increases by a factor of 2 for each successive poll;

determining the number of active nodes $N_{j+1}$ remaining at the conclusion of each round j; and removing each node that has failed to acknowledge a poll after said four successive polls, from said list of active polls.

4. A method according to claim 3 wherein said adapting step assigns a value to $R_{j+1}$ equal to the lesser of $$\frac{N_{j+1}}{N_{\max}} \times R_0,$$

and $$\frac{R_j}{2^k}$$

where $T^k < \overline{D}_j \leq T^{k+1}$, wherein k is an integer and has a value at least equal to 1, and assigns a value to $R_{j+1}$ equal to the lesser of $$\frac{N_{j+1}}{N_{\max}} \times R_0$$

and $R_j + \Delta R_0$ where $\overline{D}_j \leq T^1$.

5. A computer implemented network manager for monitoring network nodes with a minimum polling rate per round j, $R_j$, comprising:

means for polling said nodes during each round at said rate $R_j$ where $R_j$ equals $R_0$ for initial round;

means for estimating congestion in said network experienced during said round j;

means for adapting the polling rate for round j+1 based on said estimated congestion during round j, said adapted polling rate represented as $R_{j+1}$; and means for polling said nodes during round j+1 at said adapted polling rate $R_{j+1}$.

6. The computer implemented network manager of claim 5 wherein $R_j$ is set initially to $R_0$, and wherein said means for estimating further comprising means for computing a congestion metric $\overline{D}_j$ as the average delay over all resolved and outstanding polls.

7. The computer implemented network manager of claim 6 wherein said network comprises an initial maximum number of nodes to be polled in a round, $N_{max}$, said network manager further comprising a list of active nodes, said first recited and second recited means for polling further comprising:

transmitting up to four successive polls to each node where said node fails to acknowledge a prior poll within a predetermined period of time $T^1$ and wherein $T^1$ increases by a factor of 2 for each successive poll;

determining the number of active nodes $N_{j+1}$ remaining at the conclusion of each round; and removing each node that has failed to acknowledge a poll after said four successive polls, from said list of active polls.

8. The computer implemented network manager of claim 7 wherein said means for adapting includes means for assigning a value to $R_{j+1}$ equal to the lesser of $$\frac{N_{j+1}}{N_{\max}} \times R_0$$

and $$\frac{R_j}{2^k}$$

where $T^k < \overline{D_j} \leq T^{k+1}$, wherein k is an integer and has a value at least equal to 1, and means for assigning a value to $R_{j+1}$ equal to the lesser of $$\frac{N_{j+1}}{N_{max}} \times R_0$$

and $R_j + \Delta R_0$ where $\overline{D_j} \leq T^1$.

* * * * *